US012804052B2

(12) United States Patent
Natarajan et al.

(10) Patent No.: US 12,804,052 B2
(45) Date of Patent: Nov. 17, 2026

(54) COMBINED INLINE CACHE PURGING AND PERIODIC HARD PURGING IN A CACHE SERVER

(71) Applicant: Palo Alto Networks, Inc., Santa Clara, CA (US)

(72) Inventors: Badrinath Natarajan, San Jose, CA (US); Rosarin Jolly Roy Antonyraj, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 262 days.

(21) Appl. No.: 18/419,970

(22) Filed: Jan. 23, 2024

(65) Prior Publication Data

US 2025/0240353 A1 Jul. 24, 2025

(51) Int. Cl.
*H04L 67/5682* (2022.01)
*H04L 67/5681* (2022.01)

(52) U.S. Cl.
CPC ...... *H04L 67/5682* (2022.05); *H04L 67/5681* (2022.05)

(58) Field of Classification Search
CPC ............... H04L 67/568; H04L 67/5682; H04L 67/5681
See application file for complete search history.

(56) References Cited

U.S. PATENT DOCUMENTS

| | | | | |
|---|---|---|---|---|
| 9,043,428 | B2 | 5/2015 | Lobo et al. | |
| 10,743,036 | B1 * | 8/2020 | Farris | H04N 21/2353 |
| 2013/0132673 | A1 * | 5/2013 | Saito | G06F 3/065 711/E12.017 |
| 2013/0227051 | A1 * | 8/2013 | Khakpour | H04N 21/2408 709/213 |

* cited by examiner

*Primary Examiner* — Soe Hlaing
(74) *Attorney, Agent, or Firm* — Gilliam IP PLLC

(57) ABSTRACT

A cache server maintains and updates purge request counters per resource to be purged and a captured counter value per cached resource initialized with a default value. The cache server tracks resources to be purged in a purge request table, where each entry indicates a resource(s) and a purge request counter that is updated on receiving a purge request indicating the resource(s). Upon receipt of a fetch request for a resource, the cache server determines how to fulfill the request by comparing the captured counter value and the current value of the counter (if any) corresponding to the resource to determine if the resource was cached before a purge request for the resource was received. If so, the cache server refreshes the cached resource and updates the captured counter value with the value of the counter from the table. The cache server also periodically performs hard purges as a background process to remove stale cached resources.

20 Claims, 7 Drawing Sheets

COMBINED INLINE CACHE PURGING AND PERIODIC HARD PURGING IN A CACHE SERVER

BACKGROUND

The disclosure generally relates to information retrieval (e.g., CPC subclass G06F 16/00) and to storing data temporarily at an intermediate stage, such as caching (e.g., CPC subclass H04L 67/658).

A content delivery network (CDN) is a network of servers distributed across a geographic area that aims to efficiently deliver content to clients with reduced latency. Edge caching is a content delivery technique employed for CDNs by which resources are stored closer to clients in caching servers near the network's edge rather than in a single central location. When used in reference to caching, time-to-live (TTL) refers to the amount of time that cached resources are to be maintained in the cache. Until the TTL expires for a resource, requests for the resource will be served from the cache. Once the TTL expires for a resource, the existing resource will be evicted (i.e., released) from the cache, and the next request for the resource will be served from its origin. Cache eviction, also referred to as purging, is the practice of clearing resources from a cache. Once a resource is evicted from the cache, a request for the resource will be served from its origin rather than from the cache. Cache eviction helps to ensure "freshness" of cached resources in that a resource can be refreshed (i.e., evicted and retrieved from the origin again) in the cache periodically.

BRIEF DESCRIPTION OF THE DRAWINGS

Embodiments of the disclosure may be better understood by referencing the accompanying drawings.

DESCRIPTION

Figure 1:
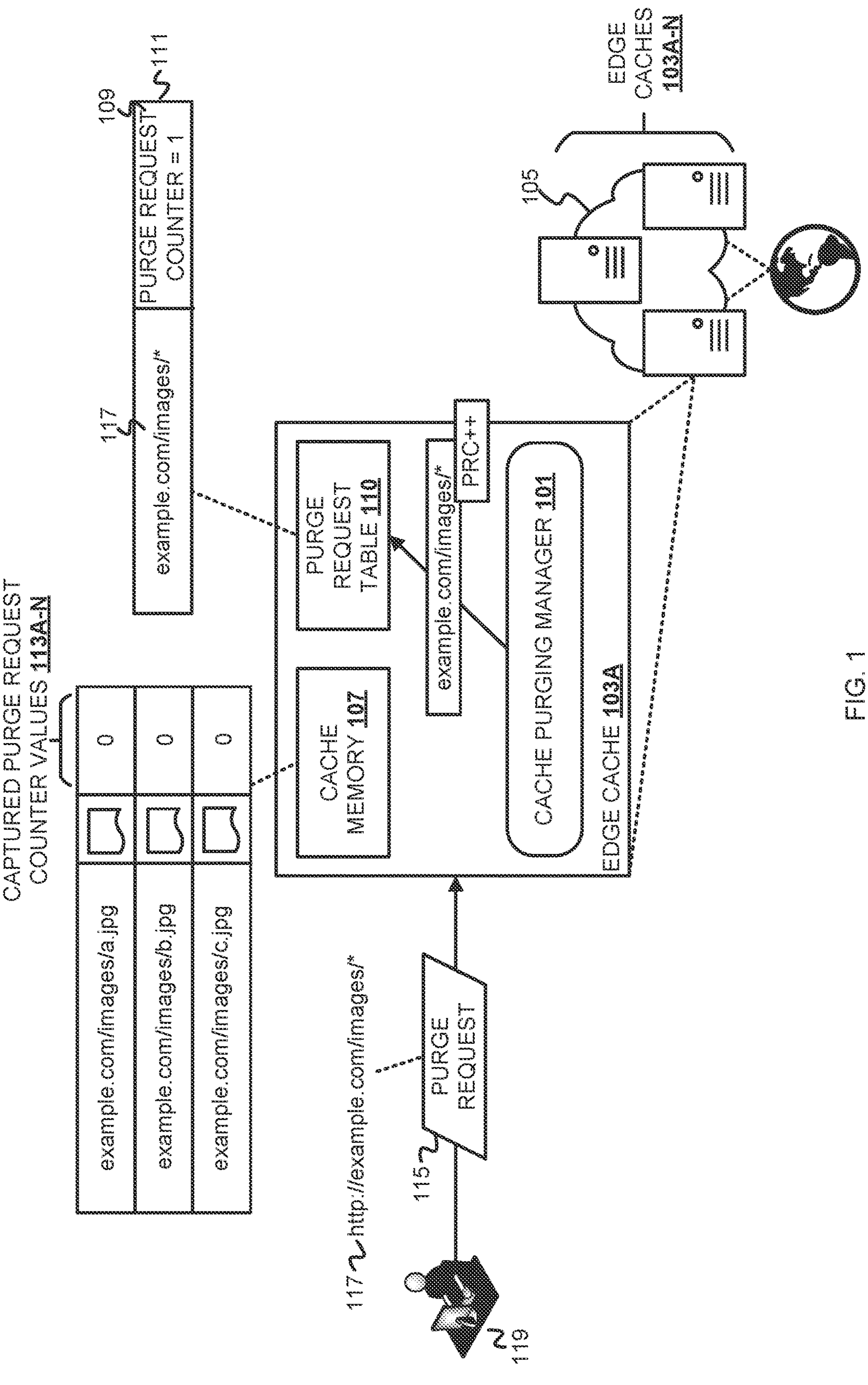
FIG. 1 is a conceptual diagram of managing purge requests received for cached resources.

The description that follows includes example systems, methods, techniques, and program flows to aid in understanding the disclosure and not to limit claim scope. Well-known instruction instances, protocols, structures, and techniques have not been shown in detail for conciseness.

Overview

Efficient purging of caches in networks with distributed cache servers, such as software-defined wide area networks (SD-WANs) or CDNs with edge caching, can be challenging due to the geographically distributed nature of the servers. Hard purges, or purges that delete a resource(s) from the cache, can incur a higher overhead. Soft purges, or purges that retain a resource(s) in the cache but effectively mark the resource(s) as inactive or invalid, are faster than hard purges but can result in inconsistencies in delivering resources that have multiple variants cached individually, such as a compressed and uncompressed versions of a file.

To mitigate these challenges, aspects of both hard purges and soft purges are implemented to purge cached resources efficiently and reliably as disclosed herein. A cache purge and refresh mechanism has been designed with a purge request counter per resource to be purged and a captured purge request counter value per cached resource that informs whether the cached resource was purged. The purge request counter for a resource(s) to be purged indicates a counter value of purge requests received at a cache server for the resource(s) that is updated (e.g., incremented) as purge requests are received for that resource(s).

A cache server maintains a purge request table that it updates as purge requests are received. When the cache server receives a purge request indicating a resource(s), the cache server updates the purge request table with an entry indicating the resource(s) to be purged and updates (e.g., increments) the purge request counter for the resource(s), which is initialized at zero or another default value. The cache server also maintains a captured purge request counter value in association with each cached resource, which has an initial value of zero if the corresponding resource is not indicated in the purge request table when it is cached or, if the resource has a match identified in the purge request table at the time it is cached, an initial value set at the value of the purge request counter maintained in the corresponding purge request table entry comprising the matching resource. When a request to fetch a resource is received, the cache server determines how to fulfill the fetch request based on searching the cache and the purge request table for the resource and comparing the captured purge request counter value and the value of the purge request counter (if any) corresponding to the requested resource. If the captured purge request counter value indicates that the resource has not been purged but the resource is indicated in the purge request table with a "newer" (i.e., greater) value of the purge request counter relative to the captured purge request counter value, then the cache server refreshes the cached resource and updates the captured purge request counter value of the cached resource with the value of the purge request counter from the purge request table.

The cache server also periodically performs hard purges as a background process to remove stale resources from the cache. When a hard purge is initiated, the cache server records the current values of the purge request counters maintained in entries of the purge request table. The cache server then compares entries in the cache and purge request table and, for each cached resource that matches a resource or group of resources in the purge request table, hard purges the resource. Hard purging the resource includes removing the resource from the cache memory and from storage of the cache server (e.g., the cache server's disk). Once the cache has been updated to remove stale entries, the cache server "cleans up" the purge request table by deleting any entry for which the current value of the purge request counter is the same as the value recorded at the start of the hard purge. This condition for removing purge requests from the purge request table prevents the premature removal of any purge requests that were updated in the purge request table during the hard purge.

Example Illustrations

FIG. 1 is a conceptual diagram of managing purge requests received for cached resources. Edge caches 103A-N, which are physical or virtual (e.g., implemented with virtual machines) edge servers with caching capabilities, are geographically distributed throughout a network 105. While not depicted in FIG. 1 for simplicity, each of the edge caches 103A-N can cache resources stored in a respective data center of the network 105. For instance, the network 105 may be an SD-WAN, where the edge caches 103A-N are instantiated at respective branch offices, or a CDN for which the edge caches 103A-N cache content. An instance of a cache purging manager 101 executes on each of the edge caches 103A-N. This example depicts the cache purging manager 101 executing on an edge cache 103A in greater detail.

The cache purging manager 101 maintains a purge request table 110. The purge request table 110 is a data structure in which the cache purging manager 101 stores indications of resources to be purged (e.g., URLs of the resources) and, for each of the resources, a purge request counter that it updates (e.g., increments) as purge requests indicating the corresponding resources are received. For instance, the purge request table 110 may be a hash table keyed by URL. While protocols have been omitted from the URLs indicated in the purge request table 110 for simplicity, in implementations, URLs identified in the purge request table 110 can indicate any protocol used for retrieval of resources, such as Hypertext Transfer Protocol (HTTP) or HTTP Secure (HTTPS). Each purge request counter maintained in an entry of the purge request table 110 comprises a monotonically increasing value that is updated (e.g., incremented) each time the cache purging manager 101 detects a purge request for the resource(s) identified in the entry and creates or updates a respective entry of the purge request table 110. Purge request counters may, for instance, be implemented with vector clocks that are initialized at zero and incremented each time a purge request indicating the corresponding resource(s) is received. This example assumes the purge request table 110 is initially empty.

The cache purging manager 101 maintains or has access to cache memory 107 of the edge cache 103A. The cache memory 107 stores resources that the edge cache 103A has cached, which in this example are depicted as having URLs "example.com/images/a.jpg", "example.com/images/b.jpg", and "example.com/images/c.jpg". Similar to the purge request table 110, while protocols are omitted from the URLs indicated in the cache memory 107 for simplicity, in implementations, URLs identified in the cache memory 107 can indicate any protocol used for retrieval of resources (e.g., HTTP/HTTPS). The cache memory 107 may be implemented as a hash table or other data structure that maps keys to values, where URLs (and optionally any variant information) are used as keys and information about each cached resource, including a location of the cached resource in memory (e.g., disk storage) of the edge cache 103A, are stored as values that can be retrieved via the respective keys. The cache purging manager 101 also maintains captured purge request counter values ("captured counter values") 113A-N for the entries of the cache memory 107, such as in a value of the corresponding hash table entry, as a label or tag attached to the corresponding entry, etc. Each of the captured counter values 113A-N comprises a value indicating if and when the respective cached resource was purged relative to the purge request counters maintained in the purge request table 110. The captured counter values 113 in this example have been initialized with a value of zero at the time that the respective resource is cached. The initial value of the captured counter values 113 is zero because this example assumes that purge requests indicating the cached resources were not received before the resources were cached). For instance, when the edge cache 103A cached the resource with the URL "example.com/images/a.jpg", the cache purging manager 101 determined that the resource is not indicated in the purge request table 110 and set the respective one of the captured counter values 113A-N with a value of zero (e.g., by associating a label or tag with the entry of the cache memory 107).

In FIG. 1, a user 119 submits a purge request 115 that indicates a wildcard URL 117. The user 119 can be a network administrator or other privileged individual. The wildcard URL 117, depicted in FIG. 1 as "example.com/images/*", comprises a wildcard character to indicate that any resource with a matching URL should be purged. The user 119 submits the purge request 115 (e.g., via user interface (UI)), and the purge request 115 is communicated to the edge cache 103A. While not depicted in FIG. 1 for simplicity, the purge request 115 can be communicated to each of the edge caches 103A-N in the network 105 so that the corresponding resource(s) can be purged from each of the edge caches 103A-N.

The cache purging manager 101 receives the purge request 115 at the edge cache 103A and updates the purge request table 110. Assuming that this is the first purge request received for the wildcard URL 117 and it was not already recorded in the purge request table 110, the cache purging manager 101 adds an entry 111 to the purge request table 110 that comprises the wildcard URL 117 and a purge request counter 109. The purge request counter 109, which may be implemented as a vector clock, is initialized at a default value (e.g., zero) and incremented as part of creating or updating the corresponding entry of the purge request table 110. For instance, when the purge request table 110 are implemented as a hash table, the cache purging manager 101 adds a key-value pair to the hash table that indicates the wildcard URL 117 as a key and an indication to increment the purge request counter 109 corresponding to the wildcard URL 117 as a value. Updating the purge request table 110 may be implemented with a put( ) method or similar. This example depicts the purge request counter 109 maintained in the entry 111 for the wildcard URL 117 as having a value of one after it has been incremented as part of updating the purge request table 110 with the entry 111.

Figure 2:
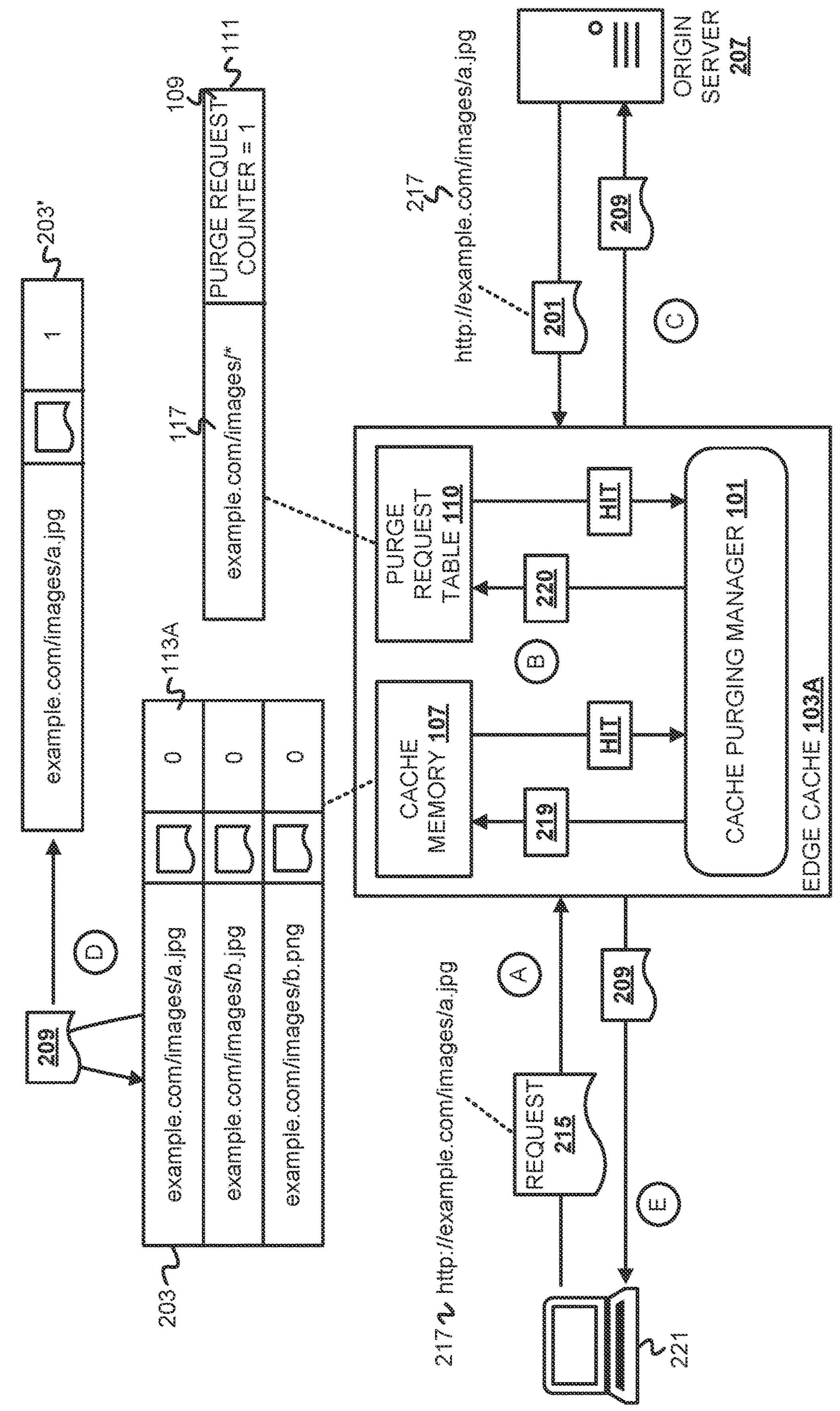
FIG. 2 is a conceptual diagram of inline purging of resources based on maintained purge requests and corresponding purge request counters for the resources.

FIG. 2 is a conceptual diagram of inline purging of resources based on maintained purge requests and corresponding purge request counters for the resources. Purging of resources is described as inline because it is performed as part of fulfilling requests for those resources. This example assumes that the resources maintained in the cache memory 107 are the same as those described in reference to FIG. 1, where the captured counter values 113A-N remain at the default value of zero (i.e., no resources have yet been purged from the cache memory 107). This example also assumes that the purge request table 110 includes the entry 111 added thereto as described in FIG. 1.

FIG. 2 is annotated with a series of letters A-E. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, a client 221 issues a request 215 that indicates a URL 217. The request 215 is an HTTP request for a resource identified by the URL 217, which in this example is “example.com/images/a.jpg”. The request 215 is first communicated to the edge cache 103A.

At stage B, the cache purging manager 101 performs lookups for the URL 217 in the cache memory 107 and the purge request table 110. The cache purging manager 101 identifies the URL 217 from the request 215 and performs a lookup 219 in the cache memory 107, where the lookup 219 at least indicates the URL 217. For implementations where URLs and variant information (e.g., whether content is compressed) are used together as keys of the cache memory 107, the lookup 219 can also indicate the variant information. The lookup 219 yields a cache hit, specifically for an entry 203 of the cache memory 107 that has the URL 217 as its key and has the captured counter value 113A set at its default value of zero. The cache purging manager 101 also performs a lookup 220 for the URL 217 in the purge request table 110. The URL 217 matches the wildcard URL 117 maintained in the entry 111, so the lookup 220 also yields a hit for the entry 111. Since both of the lookups 219, 220 yielded a hit, the cache purging manager 101 compares the captured counter value 113A set for the entry 203 in the cache memory 107 with the value of the purge request counter 109 maintained in the entry 111 of the purge request table 110. If the captured counter value maintained for a resource in the cache memory 107 has a value that is less than the value of the purge request counter maintained in the entry of the purge request table 110 for which that resource matched, the cache purging manager 101 determines that the resource was cached before the purge request indicating that resource was received, and the resource thus should be refreshed in the cache memory 107. As described above, the purge request counter 109 has a value of one, and the captured counter value 113A has a value of zero. The cache purging manager 101 thus determines that the resource identified by the URL 217 has been cached but should be refreshed since the captured counter value 113A maintained in the cache memory 107 in association with the URL 217 is less than the value of the purge request counter 109 maintained in the corresponding entry (i.e., the entry 111) of the purge request table 110.

At stage C, the cache purging manager 101 retrieves a new version of the resource corresponding to the URL 217 from its origin. The cache purging manager 101 communicates a request 201 to an origin server 207 that maintains the resource. The request 201 indicates the URL 217 and can also indicate other data/metadata identified from the request 215 (e.g., from the HTTP header). The origin server 207 is the original source of the resource, such as a server in a data center or SD-WAN location for which the edge cache 103A caches resources. In response to the request 201, the cache purging manager 101 obtains a response 209 (e.g., an HTTP response). The response 209 comprises the new version of the resource with which to serve the request 215.

At stage D, the cache purging manager 101 updates the cache memory 107 with the response 209. The cache purging manager 101 refreshes the resource in the cache memory 107 by replacing the existing resource maintained in the entry 203 with the new version of the resource obtained in the response 209. The cache purging manager 101 may update the cache memory 107 with a put( ) function or similar that updates the entry 203 already existing for the URL 217 (e.g., for the hash table entry having the URL 217 as its key). When refreshing the resource in the cache memory 107, the cache purging manager 101 also copies the value of the purge request counter 109 from the entry 111 of the purge request table 110 into the captured counter value 113A set for the entry 203 including the updated resource. The cache purging manager 101 identifies the purge request counter maintained in the entry of the purge request table 110 to which the URL 217 matched (i.e., the purge request counter 109 of the entry 111), which has a value of one, and copies its value into the entry 203 to generate an updated entry 203'. The updated entry 203' comprises the new version of the resource retrieved in the response 209 (e.g., as a value in the respective key-value pair) and the captured counter value 113A that has been updated to have a value of one.

At stage E, the edge cache 103A provides the response 209 to the client 221 to serve the request 215. The edge cache 103A provides the response 209 to the client 221, thus providing the new version of the resource identified by the URL 217. Subsequent requests for this resource that indicate the URL 217 can be served from the cache memory 107 with the newest retrieved version until another purge request is issued and received by the cache purging manager 101.

Figure 3:
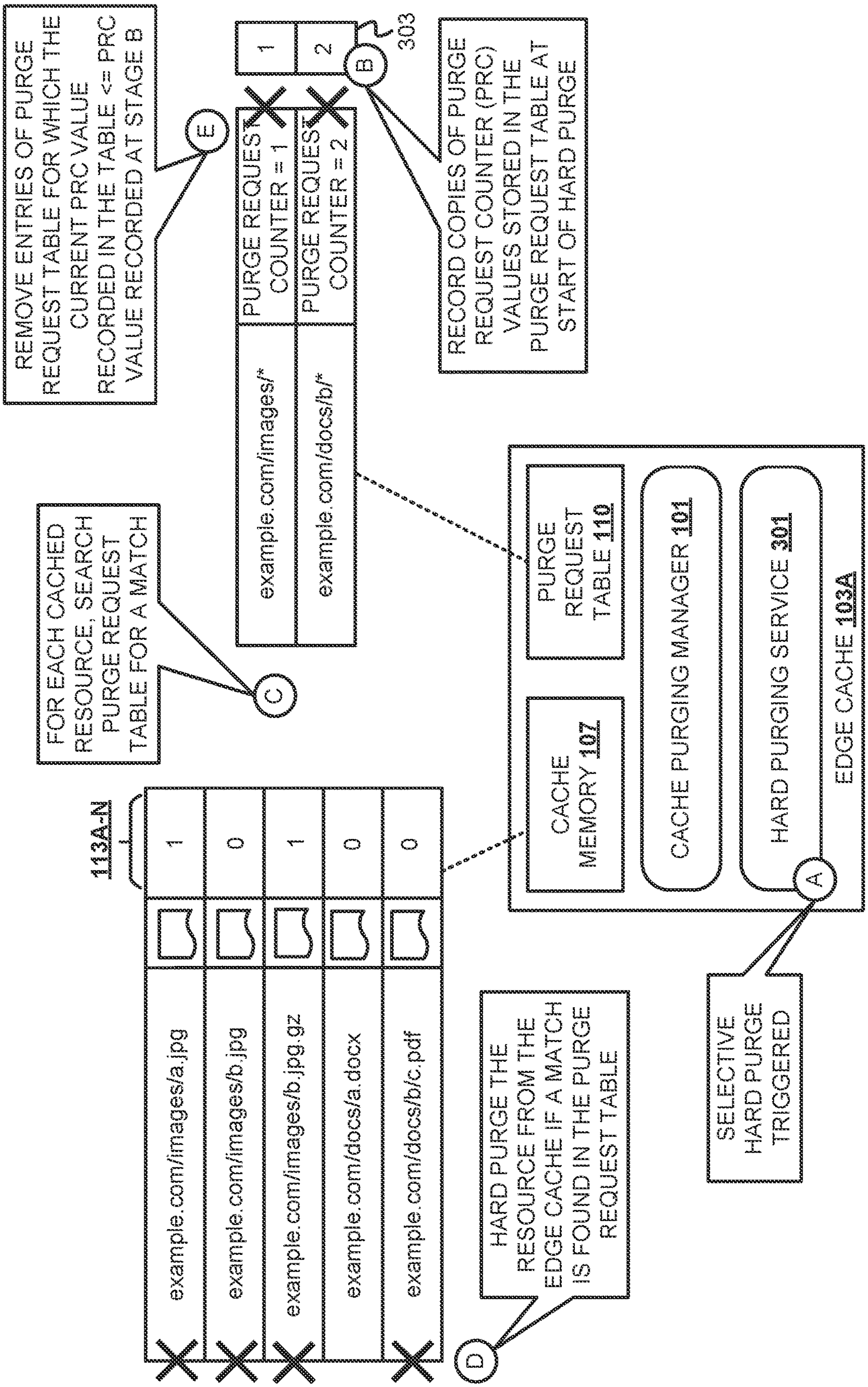
FIG. 3 is a conceptual diagram of periodically performing hard purges of select resources from a cache server.

FIG. 3 is a conceptual diagram of periodically performing hard purges of select resources from a cache server. FIG. 3 depicts the cache memory 107 and purge request table 110 described above. The cache memory 107 in this example comprises resources with URLs “example.com/images/a.jpg”, “example.com/images/b.jpg”, “example.com/images/b.jpg.gz”, “example.com/docs/a.docx”, and “example-.com/docs/b/c.pdf”. Those of the captured counter values 113A-N for the resources in the cache memory 107 with the URLs with paths “/images/a.jpg” and “/images/b.jpg.gz” have been set to one and thus have previously been purged as described in reference to FIG. 2, and the captured counter values 113A-N corresponding to the other resources are set at zero. The purge request table 110 comprise respective entries for wildcard URLs “example.com/images/*” and “example.com/docs/b/*”, which have purge request counters with values of one and two, respectively, maintained therein. The latter has a purge request counter with a value of two because two purge requests are assumed to have been issued for the resources with matching URLs, causing the purge request counter to be incremented twice (i.e., from zero to one and from one to two).

FIG. 3 also depicts a hard purging service (“service”) 301 that executes on the edge cache 103A (and others of the edge caches 103A-N depicted in FIG. 1). The service 301 executes as a background process (e.g., a daemon) that periodically evicts select resources stored in the cache memory 107 with hard purges, which also removes these resources from disk storage of the edge cache 103A. The service 301 also removes entries from the purge request table 110 for which the corresponding purges have been completed. Hard purging is non-blocking such that the cache purging manager 101 can receive purge requests and serve client requests for cached resources while the service 301 performs the hard purge.

FIG. 3 is annotated with a series of letters A-E. Each letter represents a stage of one or more operations. Although these stages are ordered for this example, the stages illustrate one example to aid in understanding this disclosure and should not be used to limit the claims. Subject matter falling within the scope of the claims can vary from what is illustrated. Additionally, stage C comprises iterative operations. The operations corresponding to stage D need not be performed after each iteration at stage C.

At stage A, selective hard purge is triggered, which launches the service 301. Selective hard purge can be performed according to a schedule or at fixed time increments (e.g., hourly). Selective hard purge can thus be triggered if a designated time since the last hard purge has elapsed.

At stage B, the service 301 records copies of values of the purge request counters stored in entries of the purge request table 110 at the start of the hard purge. The service 301 records the values of the purge request counters associated with each of the entries of the purge request table 110 separately from the purge request table 110 before beginning the hard purge. The service 301 may, for instance, record the values of the purge request counters in association with the corresponding resource indications (e.g., URLs) in a separate data structure, by creating a copy of the purge request table 110, etc. In this example, the service 301 records the value of one associated with the wildcard URL with the path "/images/*" and the value of two associated with the wildcard URL with the path "docs/b/*". The recorded purge request counter values are depicted in FIG. 3 as recorded values 303.

At stage C, the service 301 searches the purge request table 110 for a match to each cached resource identified in the cache memory 107. The service 301 iterates through entries of the cache memory 107 and, for each resource identified therein, searches the purge request table 110 for a matching resource indication (e.g., a matching URL or wildcard URL) or otherwise compares the indication of the resource to entries of the purge request table 110. The service 301 can, for instance, identify a URL maintained in the cache memory 107, search the purge request table 110 for that URL, and determine if a match is found, with this sequence performed for each URL maintained in the cache memory 107. In this example, the service 301 determines that each of the URLs "example.com/images/a.jpg", "example.com/images/b.jpg", and "example.com/images/b.jpg.gz" matches the wildcard URL "example.com/images/*" maintained in the purge request table 110, and that the URL "example.com/docs/b/c.pdf" matches the wildcard URL "example.com/docs/b/*" maintained in the purge request table 110. If a match is found, stage D is performed for the corresponding resource identified in the cache memory 107. Stage D is thus performed for each of these resources.

At stage D, the service 301 hard purges the resource that matched an entry in the purge request table 110 from the cache memory 107. Since the resource was identified in the purge request table 110, the service 301 removes the resource from the cache memory 107. During the hard purge, the service 301 also removes the resource from disk storage of the edge cache 103A based on the location of the resource in disk storage identified in the corresponding entry of the cache memory 107. The next request for the resource will result in the edge cache 103A retrieving a new version of the resource from its source (e.g., origin data center server) to refresh the resource in the cache memory 107. In this example, the service 301 hard purges the resources with the URLs "example.com/images/a.jpg", "example.com/images/b.jpg", "example.com/images/b.jpg.gz", and "example.com/docs/b/c.pdf". This stage need not be performed following each iteration at stage C. In other words, some resources may not have a match in the purge request table 110, and stage D is omitted for these resources. Operations can proceed to stage E after the iteration over entries of the cache memory 107 has terminated, or if the purge request table 110 has been searched for each resource stored in the cache memory 107. At the end of iterations of stage D for each resource in the cache memory 107 that had a match in the purge request table 110, the cache memory 107 will be up to date with the resources that should be purged at this point.

At stage E, the service 301 removes entries from the purge request table 110 for which the current value of the purge request counter maintained therein is less than or equal to the corresponding one of the recorded values 303. If the cache purging manager 101 receives a purge request for a resource(s) already identified in the purge request table 110 during the iteration through the cache memory 107 at stage C, the corresponding purge request counter will be incremented. This value will be greater than the previously maintained value because purge request counters are monotonically increasing. Any resources for which a purge request was received during the hard purge thus should remain in the purge request table 110. Other resources that were designated for purging at the start of the hard purge, however, should be removed from the purge request table 110 since the respective resources in the cache memory 107 have also been purged at this point. In this example, the recorded values 303 have values of one and two, which each satisfy the criterion for removal of the respective entries from the purge request table 110 since this example assumes that the purge request counters maintained in the purge request table 110 are not incremented during the hard purge. The service 301 thus removes both entries from the purge request table 110. Removal of entries from the purge request table 110 keeps the purge request table 110 current and also at a manageable size.

Figure 4:
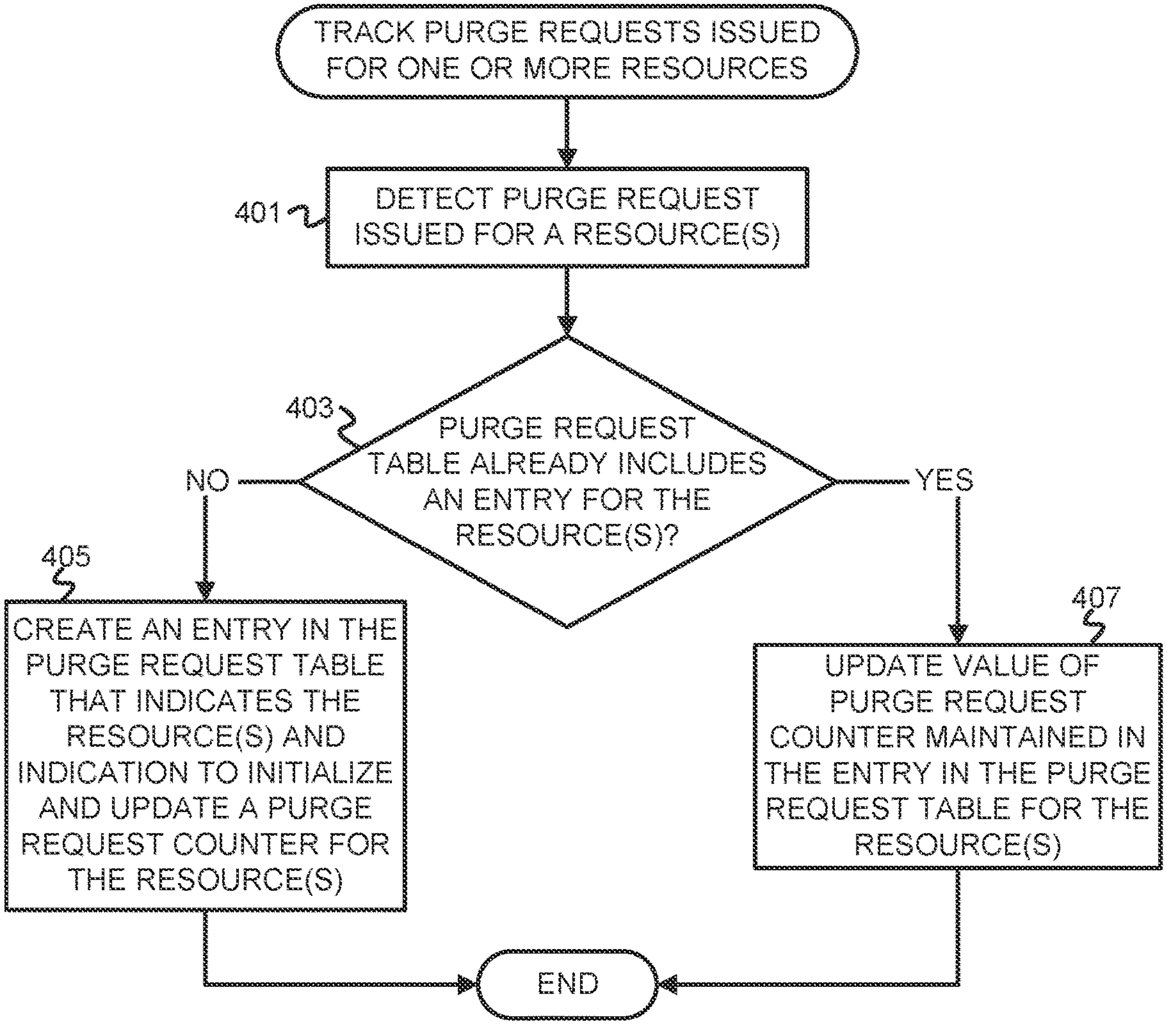
FIG. 4 is a flowchart of example operations for tracking purge requests issued for one or more resources.
Figure 5:
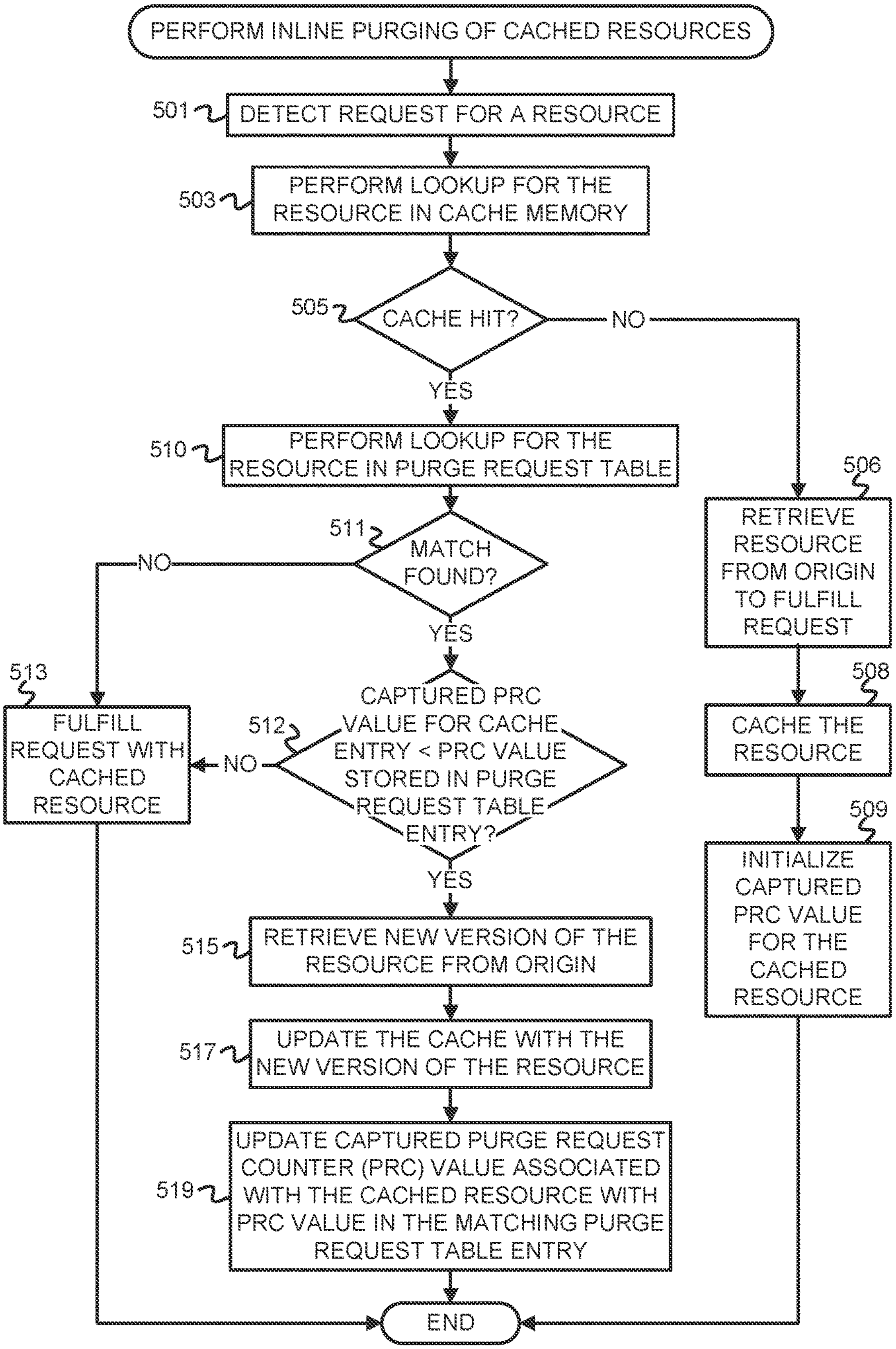
FIG. 5 is a flowchart of example operations for performing inline purging of cached resources.
Figure 6:
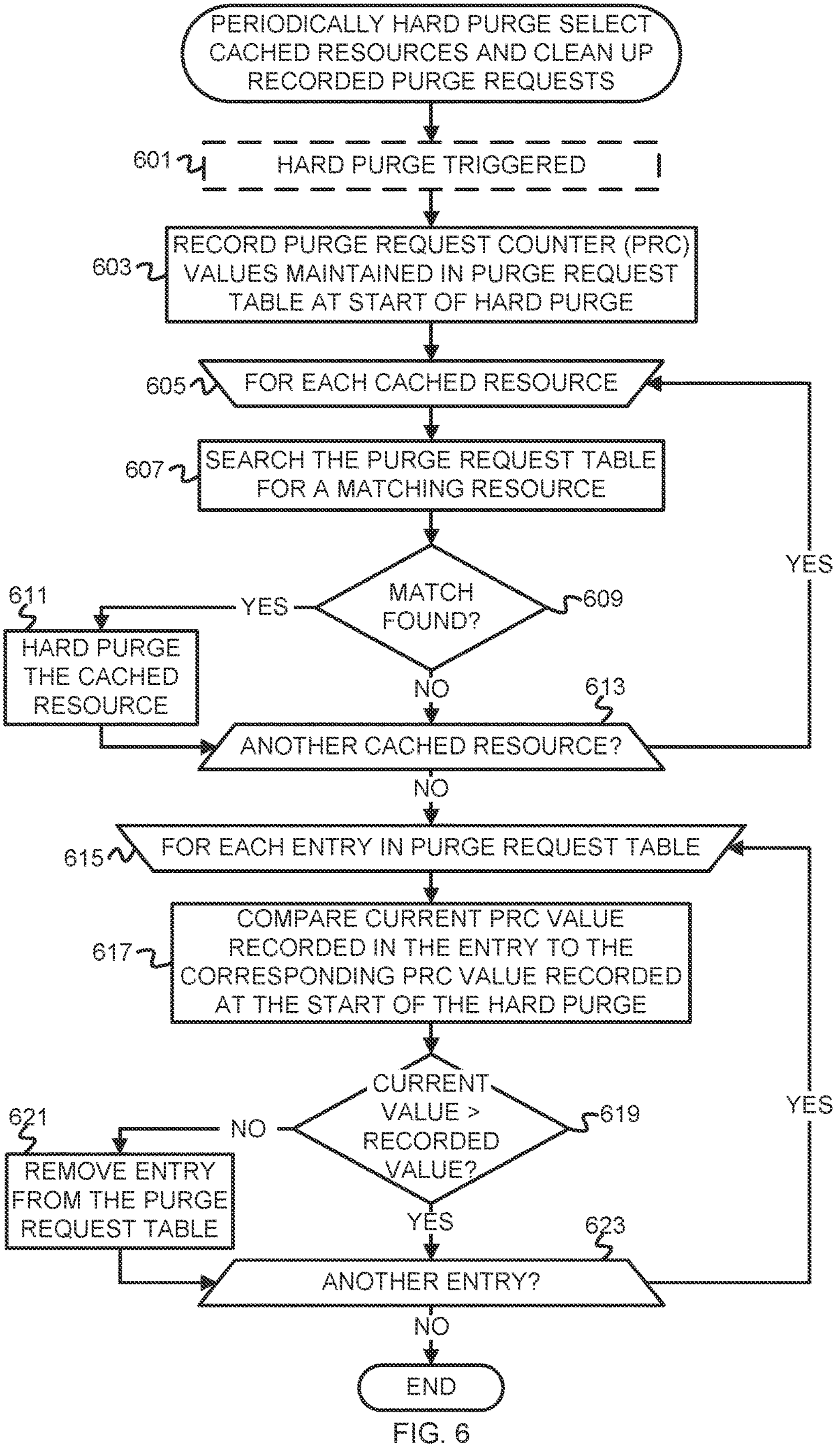
FIG. 6 is a flowchart of example operations for periodically hard purging select resources from a cache and cleaning up recorded purge requests.

FIGS. 4-6 are flowcharts of example operations. The example operations are described with reference to a resource purging manager and a hard purging service for consistency with the earlier figure and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. Instances of the resource purging manager and the hard purging service execute on each cache server instantiated for a network.

FIG. 4 is a flowchart of example operations for tracking purge requests issued for one or more resources. Purge requests may be issued by a privileged entity within a network (e.g., an SD-WAN), such as a network administrator or other individual with elevated privileges for managing cache servers of the network. The example operations are performed by a cache purging manager instance executing on each cache server in the network (e.g., each edge cache server). The example operations assume that the cache purging manager maintains or has access to a purge request table, which can be a hash table or other data structure that can map indications of resources (e.g., URLs) to values.

At block 401, the cache purging manager detects a purge request issued for a resource(s). The purge request identifies a resource or a group of resources. The purge request can identify the resource(s) by its respective URL. A group of resources may be specified using a wildcard character in the URL (i.e., "*"). Subsequent operations assume that the purge request identifies a single resource or a single group of resources, but implementations may allow purge requests to indicate multiple distinct resources and/or non-overlapping groups of resources. In this case, subsequent operations can be performed for each individual resource or individual group of resources. Received purge requests may be queued for processing by the cache purging manager, where the cache purging manager retrieves purge requests from the queue in the order they are received.

At block 403, the cache purging manager determines if the purge request table already includes an entry for the resource(s). The cache purging manager can search the purge request table for the identifier of the resource(s) (e.g., the URL(s)). Determining if the purge request table already identifies the resource(s) may be performed as part of updating the purge request table with the resource(s), such as if the purge request table is implemented as a hash table updated with a put( ) call; in other words, depending on the implementation of the purge request table, the cache purging manager does not necessarily perform an explicit determination of whether the purge request table already includes an entry indicating the resource(s). If the purge request table does not already include an entry for the resource(s), operations continue at block 405. If the purge request table already includes an entry for the resource(s), operations continue at block 407.

At block 405, the cache purging manager creates an entry in the purge request table that indicates the resource(s) and an indication to initialize and update a purge request counter for the resource(s). Purge request counters are monotonically increasing and may be initialized with a default value (e.g., zero). For instance, purge request counters may be implemented with vector clocks. In other examples, purge request counters can be implemented with another type of clock, such as by using a Unix clock. Updating the purge request counter can thus include incrementing the counter, updating the counter with a current time (e.g., the current Unix time), etc. The cache purging manager adds an entry in the purge request table that identifies the resource(s), such as by the URL provided in the purge request, and an indication to initialize and update a purge request counter value of the purge request counter (i.e., the value after it was incremented at block 402). For instance, the cache purging manager can insert a key-value pair into the purge request table that includes the URL as a key and the indication to initialize and update a purge request counter as a value. To illustrate, the purge request counter for the resource(s) may be implemented with a vector clock that is initialized at zero and updated by incrementing the vector clock as a result of creating the entry for the resource(s) in the purge request table.

At block 407, the cache purging manager updates a value of the purge request counter maintained in the purge request table for the resource(s). For instance, insertion of a key-value pair into the purge request table that includes the URL as a key and an indication to increment the value of the purge request counter as a value (e.g., via a put( ) method or similar). Updating the purge request counter for the resource(s) results in the purge request counter being updated, such as incremented, from its previous value (e.g., from one to two).

FIG. 5 is a flowchart of example operations for performing inline purging of cached resources. As described above, purging of cached resources is described as inline because it is performed as part of serving requests for those resources received from clients. The cache purging manager is able to access (e.g., perform lookups in) cache memory that the corresponding cache server maintains. The cache purging manager also maintains a purge request table that maps indications of resources to be purged to their corresponding purge request counters, which are incremented as purge requests are received as described in reference to FIG. 4.

At block 501, the cache purging manager detects a request for a resource. The request can be an HTTP request indicating a URL of a resource, such as a resource maintained in a data center or other network location (e.g., a branch location) for which a cache server on which the cache purging manager executes caches resources.

At block 503, the cache purging manager performs a lookup for the resource in the cache memory. The cache purging manager performs a lookup for the resource in the cache memory using an indication of the resource, such as the resource URL and optionally any variant information, such as an indication of whether the cached resource may be compressed.

At block 505, the cache purging manager determines if the lookup yielded a cache hit. If the lookup did not yield a cache hit, or if the resource has not been cached, operations continue at block 507. If the lookup yielded a cache hit, or if the resource was cached, operations continue at block 510.

At block 506, the cache purging manager retrieves the resource from its origin to fulfill the request. The cache purging manager obtains the resource from its origin via a request sent to its origin server (e.g., an HTTP request) and responds to the request with the obtained resource (e.g., with the HTTP response elicited by the HTTP request).

At block 508, the cache purging manager caches the resource. The cache purging manager caches the resource by storing a key-value pair identifying the resource in cache memory and may also store the resource in storage (e.g., disk storage), where the created entry in the cache memory indicates the location of the resource in storage.

At block 509, the cache purging manager initializes a captured purge request counter value ("captured PRC value") for the cached resource. The initial captured PRC value is dependent on whether a purge request indicating the resource was received previously, which the cache purging manager can determine by performing a lookup for the resource in the purge request table. If there is no match found as a result of the lookup, the captured PRC value is initialized at zero. If the purge request table lookup results in finding a match, the captured PRC value is initialized with the value of the purge request counter maintained in the corresponding purge request table entry. The captured PRC value can be included in the key-value pair that is cached for the resource, as a label or tag that the cache purging manager attaches to the corresponding entry in the cache memory, etc.

At block 510, the cache purging manager performs a lookup for the resource in the purge request table. The cache purging manager uses the URL of the resource or other identifier supplied in the request to perform the lookup. Since the purge request table may maintain wildcard URLs indicating groups of resources that should be purged, the cache purging manager performs the lookup to determine if the resource matches to any resource indications (e.g., URLs or wildcard URLs) maintained in the purge request table.

At block 511, the cache purging manager determines if a match was found in the purge request table. The match may be an exact match or may be a match to a wildcard or other pattern. If a match was not found, operations continue at block 513. If a match was found, operations continue at block 512.

At block 512, the cache purging manager determines if the captured PRC value maintained for the cache entry corresponding to the resource is less than the value of the purge request counter stored in the corresponding purge request table entry. The value of the purge request counter stored in the corresponding purge request table entry is that stored in the entry of the purge request table having the matching resource indication identified at block 511. A captured PRC value maintained for the resource in the cache memory that is less than the value of the purge request counter stored in the corresponding purge request table entry is indicative that the cached resource is older than the purge request, so the resource was thus cached before a purge request was issued for the resource and should be refreshed. To illustrate, the captured PRC value associated with the resource in the cache memory may have a default value of zero, while the value of the purge request counter may be nonzero (e.g., one or greater). If the resource has already been purged from the cache memory, the captured PRC value maintained for the resource in the cache memory should be equal to the purge request counter value maintained in the entry of the purge request table with the matching resource indication. If the captured PRC value associated with the resource in the cache memory is not less than (e.g., is equal to) the purge request counter value, operations continue at block 513. If the captured PRC value associated with the resource in the cache memory is less than the purge request counter value, operations continue at block 515.

At block 513, the cache purging manager fulfills the request with the cached resource. If flow proceeded to block 513 from block 511, the cache purging manager can fulfill the request with the cached resource because the cache lookup yielded a hit but the resource was not designated to be purged in the purge request table. If flow proceeded to block 513 from block 512, since the cache lookup yielded a hit and, as evident from the comparison of the captured PRC value and purge request counter value corresponding to the resource, the resource has presumably been purged from the cache according to the associated purge request. The cache purging manager can thus respond to the request using the cached version of the resource.

At block 515, the cache purging manager retrieves a new version of the resource from its origin. The cache purging manager obtains the new version of the resource from its origin via a request sent to its origin server (e.g., an HTTP request).

At block 517, the cache purging manager updates the cache with the new version of the resource. The cache purging manager replaces the existing version of the resource stored in the cache with the newly retrieved resource by updating the entry in the cache that identifies the resource with the new version of the resource (e.g., the new HTTP response).

At block 519, the cache purging manager updates the captured PRC value associated with the cached resource with the value of the purge request counter identified in the matching purge request table entry. The cache purging manager can update the cache entry corresponding to the refreshed resource or the label, tag, etc. associated therewith to update the captured PRC value with the purge request counter value identified in the matching entry of the purge request table. To illustrate, if the purge request counter has a value of two, the cache purging manager updates the captured PRC value to have a value of two. Updating the captured PRC value maintained for the resource in the cache with the purge request counter value identified from the corresponding entry of the purge request table serves to indicate that the resource has been refreshed in the cache. Upon receiving the next request for the resource, assuming another purge request for the resource is not issued and the resource has not been hard purged from the cache server, the comparison at block 512 will yield a determination that the captured PRC value is the same as the value of the purge request counter maintained in the matching entry of the purge request table, and the request can be fulfilled from the cache.

FIG. 6 is a flowchart of example operations for periodically hard purging select resources from a cache and cleaning up recorded purge requests. The example operations are performed with reference to the hard purging service (hereinafter simply "the service"). The service has access to the cache memory and a purge request table in which purge requests have been recorded. The service executes as a background process of the cache server (e.g., as a daemon). The example operations thus are able to be performed at least partially concurrently with those of FIGS. 4 and 5.

At block 601, a hard purge is triggered. The hard purge may be triggered based on a schedule, based on an elapsed time since the last hard purge, etc. Triggering of the hard purge may cause the service to be launched.

At block 603, the service records purge request counter values maintained in the purge request table at the start of the hard purge. For each entry of the purge request table, the service records the value stored in the purge request counter field at the start of the hard purge. As described above, for each purge request that was received, the purge request table was updated to create an entry comprising an indication of the indicated resource(s) (e.g., a URL) and a purge request counter initialized at zero and incremented or to update an existing entry indicating the resource(s) to be purged to increment the corresponding purge request counter. The service may, for instance, make a copy of the purge request table. The service records the values maintained in the purge request table separate from the purge request table itself since these values may be modified during the hard purge as the cache server receives new purge requests for resources already identified in the purge request table and increments the corresponding purge request counters.

At block 605, the service begins iterating through each cached resource. The service iterates over each entry of the cache memory that corresponds to a cached resource.

At block 607, the service searches the purge request table for a matching resource. The service searches the purge request table with an identifier of the cached resource, such as its URL. For instance, the service can search the purge request table for the URL identified in the cache entry to determine if the URL has an exact match in the purge request table or matches a URL pattern or URL with a wildcard character (e.g., in the URL path) in the purge request table.

At block 609, the service determines if a match was found. A match could be found if the purge request table includes an entry with an identifier of the cached resource or a pattern to which the identifier of the cached resource matches, such as the URL of the cached resource or a wildcard URL to which the cached resource's URL matches, respectively. If a match was found, operations continue at block 611. If a match was not found, operations continue at block 613.

At block 611, the service hard purges the cached resource. The service purges the resource from the cache memory with a hard purge so that the corresponding entry is removed from the cache memory and also from disk storage of the cache server. The service determines the location of the cached resource in disk memory based on the corresponding entry of the cache memory, which should indicate the location. Upon the next request for the resource, the cache server will retrieve the newest version of the resource from its origin due to it being purged from the cache.

At block 613, the service determines if there is another cached resource. If there is another cached resource, or another entry in the cache to process, operations continue at block 605. If there is not another cached resource, and each entry of the cache has been processed, operations continue at block 615.

At block 615, the service begins iterating through the entries in the purge request table. The service iterates over each entry of the purge request table that indicates one or more resources identified in a received purge request.

At block 617, the service compares the current value of the purge request counter recorded in the entry to the corresponding purge request counter value that was recorded at the start of the hard purge. The service compares the value stored in the entry at the start of the hard purge that was recorded separately from the purge request table at block 603 with the current value of the purge request counter maintained in the entry of the purge request table.

At block 618, the service determines if the current value of the purge request counter maintained in the entry is greater than the value of the purge request counter corresponding to the entry recorded at the start of the hard purge. If the value of the purge request counter maintained in the entry has increased since the beginning of the hard purge, this is indicative that a purge request for the resource(s) identified in the entry was received during the hard purge, causing the purge request counter to be incremented. If the current value is not greater than the previously recorded value (e.g., if the values are equal), operations continue at block 621. If the current value is greater than the previously recorded value, the entry is maintained in the purge request table, and operations continue at block 623.

At block 621, the service removes the entry from the purge request table. Since any resource that matched the indication of the resource(s) maintained in the entry was purged from the cache at block 611, the entry can be removed from the purge request table.

At block 623, the service determines if there is another entry in the purge request table to process. If there is another entry, operations continue at block 615. If there is not another entry, and each of the entries have thus been processed, operations are complete.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
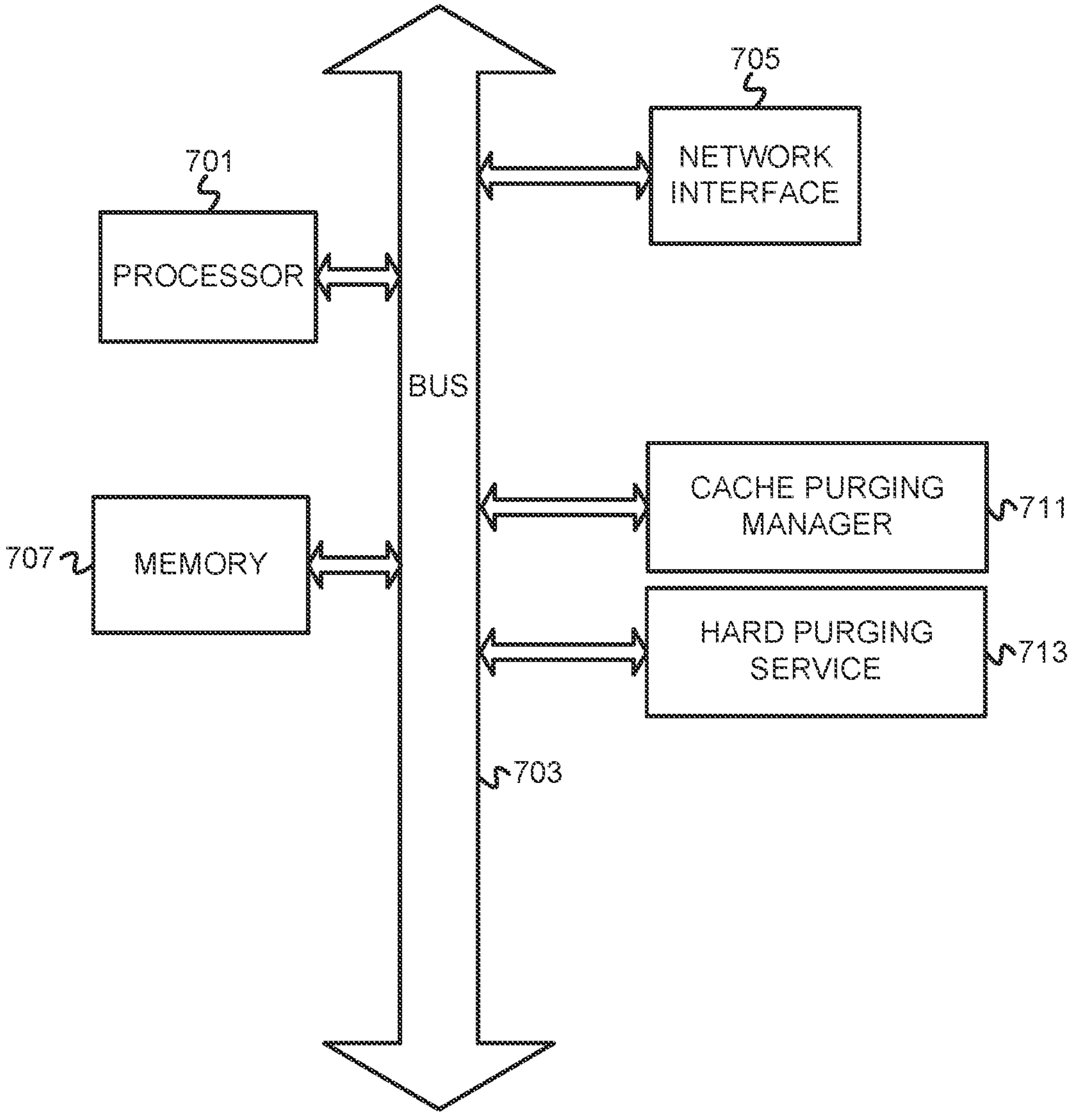
FIG. 7 depicts an example computer system with a cache purging manager and a hard purging service.

FIG. 7 depicts an example computer system with a cache purging manager and a hard purging service. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes cache purging manager 711 and hard purging service 713. The cache purging manager 711 manages receipt of purge requests for cached resources and performs inline purging of cached resources indicated in received purge requests by using purge request counters per purged resource that are maintained in a purge request table. The hard purging service 713 periodically performs hard purges of select resources from the cache by utilizing the purge request table. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

detecting, by an edge server, a request for a resource;

determining that the resource has been cached by the edge server based on performing a lookup in a first data structure;

determining that a purge request was issued for the resource based on performing a lookup in a second data structure, wherein the second data structure maintains indications of a plurality of resources for which purge requests have been issued and a corresponding plurality of purge request counters, wherein the second data structure comprises an entry that indicates the resource and a first purge request counter of the plurality of purge request counters;

retrieving a new version of the resource from an origin server;

updating an entry of the first data structure with the new version of the resource; and copying a value of the first purge request counter into the entry of the first data structure to indicate that the resource has been refreshed in the first data structure.

2. The method of claim 1 further comprising, based on receiving the purge request for the resource, updating the second data structure with the entry comprising an indication of the resource and the first purge request counter, wherein updating the second data structure comprises initializing the first purge request counter with a value of zero or incrementing the first purge request counter.

3. The method of claim 2 further comprising, based on performing the lookup in the second data structure, comparing a value captured for the resource in the first data structure and the value of the first purge request counter maintained for the resource in the second data structure, and wherein retrieving the new version of the resource from its origin is based on determining that the captured value is less than the value of the first purge request counter.

4. The method of claim 1, wherein each of the plurality of purge request counters is implemented with a vector clock.

5. The method of claim 1 further comprising performing a hard purge for cached resources stored in the first data structure, where performing the hard purge comprises, for each entry of a first plurality of entries of the first data structure, determining if a resource indicated in the entry matches an indication of one or more resources in one of a second plurality of entries of the second data structure; and based on determining that a first resource indicated in a first entry of the first data structure matches an indication of one or more resources in a second entry of the second data structure, removing the first entry from the first data structure and removing the first resource from disk storage.

6. The method of claim 5 further comprising:

based on initiation of the hard purge, recording values of the plurality of purge request counters; and for each entry of the second plurality of entries of the second data structure and corresponding purge request counter of the plurality of purge request counters, determining if a current value of the purge request counter is equal to a corresponding one of the recorded values; and based on determining that the current value of the purge request counter is equal to the corresponding one of the recorded values, removing the entry from the second data structure.

7. The method of claim 5, wherein hard purging of cached resources is performed periodically.

8. The method of claim 1, wherein determining that the resource has been cached comprises determining that the lookup in the first data structure yields a cache hit for the resource, wherein determining that the purge request was issued for the resource comprises determining that the resource is indicated in the entry of the second data structure based on the lookup in the second data structure.

9. The method of claim 1 further comprising, based on determining that the resource has not been cached and is not indicated in the second data structure, caching the resource and initializing a value set for the resource in the entry of the first data structure at zero.

10. The method of claim 1, wherein the edge server is on an edge of a software-defined wide area network (SD-WAN) or a content delivery network (CDN).

11. A cache server comprising:

a processor; and a machine-readable medium having instructions stored thereon that are executable by the processor to cause the cache server to, based on detection of a request for a resource, determine that the resource has been cached based on performance of a lookup for the resource in a first data structure;

determine that a purge request was issued for the resource based on performance of a lookup for the resource in a second data structure, wherein the second data structure maintains indications of a plurality of resources for which the cache server has received purge requests and a corresponding plurality of purge request counters, wherein a first entry of the second data structure comprises an indication of the resource and a corresponding first purge request counter of the plurality of purge request counters; and refresh the resource in the first data structure, wherein the instructions to refresh the resource in the first data structure comprise instructions to retrieve a new version of the resource and update a captured counter value associated with the resource in the first data structure with a value of the first purge request counter.

12. The cache server of claim 11 further comprising instructions executable by the processor to cause the cache server to, based on receipt of the purge request for the resource, update the second data structure with the first entry comprising the indication of the resource and the first purge request counter, wherein the instructions executable by the processor to cause the cache server to update the second data structure comprise instructions executable by the processor to cause the cache server to initialize the first purge request counter with a value of zero or increment the first purge request counter.

13. The cache server of claim 12 further comprising instructions executable by the processor to cause the cache server to, based on a determination that the purge request was issued for the resource, compare the captured counter value associated with the resource in the first data structure and the value of the first purge request counter maintained in the second data structure, and wherein refreshment of the resource in the first data structure is based on a determination that the captured counter value is less than the value of the first purge request counter.

14. The cache server of claim 11 further comprising instructions executable by the processor to cause the cache server to:

for each entry of a first plurality of entries of the first data structure, determine if a resource indicated in the entry matches an indication of one or more resources in one of a second plurality of entries of the second data structure; and based on a determination that a first resource indicated in a first entry of the first data structure matches an indication of one or more resources in a second entry of the second data structure, perform a hard purge of the resource from the cache server.

15. The cache server of claim 14, wherein the instructions executable by the processor to cause the cache server to perform the hard purge of the resource from the cache server comprise instructions executable by the processor to cause the cache server to remove the first entry from the first data structure and remove the resource from disk storage.

16. One or more non-transitory computer-readable media having program code stored thereon, the program code comprising instructions to:

detect, by an edge server, a request for a resource;

determine whether the resource has been cached by the edge server based on performing a lookup in a first data structure;

based on a determination that the resource has been cached by the edge server, determine whether a purge request was issued for the resource based on performing a lookup in a second data structure, wherein the second data structure maintains indications of a plurality of resources for which purge requests have been issued and a corresponding plurality of purge request counters, wherein the second data structure comprises an entry that indicates the resource and a first purge request counter of the plurality of purge request counters;

based on a determination that a purge request was issued for the resource, retrieve a new version of the resource from an origin server;

update an entry of the first data structure with the new version of the resource; and copy a value of the first purge request counter into the entry of the first data structure to indicate that the resource has been refreshed in the first data structure.

17. The non-transitory computer-readable media of claim 16, wherein the program code further comprises instructions to, based on receipt of the purge request for the resource, update the second data structure with the entry comprising an indication of the resource and the first purge request counter, wherein the instructions to update the second data structure comprise instructions to initialize the first purge request counter with a value of zero or increment the first purge request counter.

18. The non-transitory computer-readable media of claim 16, wherein the program code further comprises instructions to, based on performing the lookup in the second data structure, compare a value captured for the resource in the first data structure and the value of the first purge request counter maintained for the resource in the second data structure, and wherein the instructions to retrieve the new version of the resource from its origin comprise instructions to retrieve the new version of the resource based on a determination that the captured value is less than the value of the first purge request counter.

19. The non-transitory computer-readable media of claim 16, wherein the instructions to determine whether the resource has been cached comprise instructions to determine whether the lookup in the first data structure yields a cache hit for the resource, wherein the instructions to determine whether the purge request was issued for the resource comprise instructions to determine whether the resource is indicated in the entry of the second data structure based on the lookup in the second data structure.

20. The non-transitory computer-readable media of claim 16, wherein the program code further comprises instructions to, based on a determination that the resource has not been cached and is not indicated in the second data structure, cache the resource and initialize a value set for the resource in the entry of the first data structure at zero.

* * * * *